MAURICE BARNETT AND LOUIS BURGESS, OF NEW YORK, N. Y.

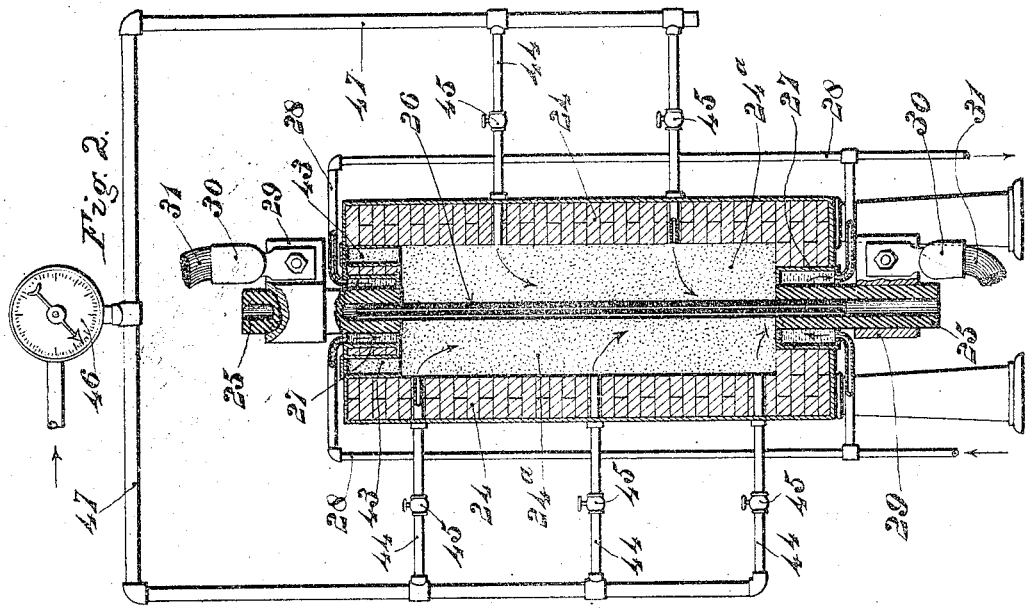

ART OF PRODUCING ALUMINUM NITRID.

1,252,649.

Specification of Letters Patent.

Patented Jan. 8, 1918.

Application filed June 1, 1917. Serial No. 172,167.

*To all whom it may concern:*

Be it known that we, MAURICE BARNETT and LOUIS BURGESS, citizens of the United States, residing at New York, in the county of New York and State of New York, have invented or discovered certain new and useful Improvements in the Art of Producing Aluminum Nitrid, of which the following is a specification, reference being had therein to the accompanying drawing.

This invention or discovery relates to the art of producing aluminum nitrid and has for its object the production of this substance at less expense than is involved in the production thereof by processes heretofore in use. In practising the present invention or discovery aluminum carbid is treated with nitrogen gas at a temperature above 900° C. and below 2000° C., but preferably between 900° C. and 1200° C. in which range of temperatures conversion of the aluminum carbid into aluminum nitrid takes place.

The method of manufacturing aluminum nitrid heretofore and at present in use consists in passing nitrogen, or producer gas, over a mixture of carbon and bauxite, previously calcined, heated to about 1800° C. or 1900° C. in a revolving electric resistance furnace. The manipulation of such a resistance furnace, operating at these high temperatures, is a matter of difficulty, as is also the preservation of the lining of the furnace. The nitrid so produced is a grayish powder which can be converted into sodium aluminate and ammonia by treatment with sodium hydroxid only by prolonged boiling, preferably in an autoclave. Furthermore, in the manufacture of aluminum nitrid under the processes heretofore and now employed, the high temperature frequently leads to reversal of reaction. The working temperatures must be carefully watched and maintained within certain limits, otherwise the product obtained contains little nitrogen and is difficult to decompose.

In the manufacture of aluminum nitrid by our new process several marked advantages are secured. In the first place, the aluminum nitrid is produced at a moderate temperature. Again, the manufacture of aluminum nitrid at moderate temperatures tends to increase the life of the furnace linings. Furthermore, on account of the relatively low temperatures employed in our process there is no danger of reversal of reaction. Lastly, the aluminum nitrid made by our process is easily decomposed by treatment with suitable acids and alkalis even in the cold.

In the accompanying drawing Figures 1 and 2, are somewhat diagrammatic sectional views of two forms of apparatus which may be used for the production of aluminum nitrid by our process.

Referring to Fig. 1, 12 denotes a furnace which may be of iron with a suitable refractory lining, such as firebrick. Within the furnace 12 is a retort 14 of any suitable material, as clay, and within which the aluminum carbid to be treated will be placed and in which retort it will be subjected to the action of nitrogen gas which may be introduced into the retort by pipes 15 preferably provided with valves 16 by which the flow of nitrogen gas to the chamber of the retort may be regulated. Air and moisture will be excluded from the retort as far as possible. The furnace and retort may be heated in any suitable manner, as by means of oil firing, gas as at burners 12ª, or by means of a fire exterior to the furnace.

The retort 14 is preferably provided at its upper part with a charging hopper 18 provided with a movable cover 19. At the bottom of the retort 14 there is preferably provided a hinged door 33, the lining of which is of refractory material, and which door may be opened downwardly when the aluminum nitrid, produced in the retort, is to be removed. The hinged door 33 may be held closed by a spring catch 35. The nitrogen gas inlet pipes 15 may all be connected to a manifold 13 which communicates with the source of the nitrogen. Between the source of the nitrogen and the manifold 13 there will preferably be a meter 17 by which the flow of the nitrogen gas may be determined. The furnace 12 is provided near its top with a pipe 23 leading to a stack or chimney, and said furnace may be supported by any suitable means, as by columns or by an arch.

Another form of apparatus which may be employed in the production of aluminum nitrid by our process is shown in Fig. 2. Referring to Fig. 2, 24 denotes the walls of the furnace and 24ª the comminuted aluminum carbid within the furnace chamber. 25 denotes holders for the resistance element 26 which may consist of carbon or graphitic carbon, the said resistance holders 25 being preferably surrounded by water jackets 27 mounted in the furnace walls. The water jackets 27 will, in practice, be provided with inlet and outlet pipes 28 so that a circulation of water may be maintained in said jackets for the purpose of preventing the resistance holders from becoming overheated. The resistance holders 25 are preferably formed hollow or tubular, as shown, so that the resistance element may be more readily inserted and also to permit the resistance element to be knocked out at the end of an operation. Electrically connected with the resistance holders, by means of attached parts 29 and 30, are suitable conductors 31 by which a current of electricity, either direct or alternating, may be caused to pass.

It will be understood that any suitable furnace may be employed in carrying on our process and that the apparatus shown in Figs. 1 and 2 represents only two forms of equipment by which our invention may be carried into effect.

In practising our invention with the apparatus shown in Fig. 1 we take aluminum carbid and grind same to about 20 mesh. We introduce this through the hopper 18 into the retort 14. Heat is then applied to the retort 14 and when the aluminum carbid contained in the retort has been brought to a temperature of preferably from 900° C. to 1200° C. nitrogen gas is introduced into the retort through the pipes 15. When the meter 17 shows that nitrogen gas is no longer being absorbed by the aluminum carbid, the operation may be stopped by cutting off the source of heat and allowing the furnace to cool down. When the aluminum nitrid which has been produced in retort 14 has cooled down it may be removed through the hinged door 33.

In practising our invention with the apparatus shown in Fig. 2 the furnace 24 is filled with aluminum carbid, ground to about 20 mesh through openings 43 in the top of the furnace, which openings (after the furnace has been charged) may be closed by plugs or otherwise. Electric current of suitable strength is then passed through the resistance element 26 the current being maintained at such strength that the charge of aluminum carbid is heated preferably between 900° C. and 1200° C. When the charge of aluminum carbid has been brought to the described temperature nitrogen gas is passed into the chamber of the furnace by means of pipes 44 preferably provided with valves 45 by which the flow of nitrogen gas to the chamber of the furnace may be regulated. After the reaction begins the current is so regulated that the charge remains at the desired temperature.

The pipes 44 may all be connected to a manifold 47 which is connected to the source of the nitrogen gas. Between the source of the nitrogen gas and the manifold 47 there will preferably be a meter 46 by which the flow of nitrogen gas may be determined. When the meter 46 shows that the nitrogen gas is not being absorbed by the furnace charge, the operation may be stopped by cutting off the electric current. After the furnace charge has cooled the walls of the furnace 24 may be partly removed from the charge and the aluminum nitrid will be found within in a more or less compact mass. In practice we have found that aluminum carbid containing traces of silicon, titanium and iron, or any of them, either free or in the form of carbids, will combine with nitrogen with exceptional ease.

The aluminum carbid employed in this process is preferably that made in accordance with the process covered by our U. S. Patent No. 1,222,593, dated April 17, 1917, as carbid made in accordance with said patent may be successfully treated in the production of aluminum nitrid at the relatively low temperatures hereinbefore set forth, and in such treatment will absorb from 17% to 22% of its weight of nitrogen.

Having thus described our invention or discovery we claim and desire to secure by Letters Patent:

1. The herein described process for producing aluminum nitrid, consisting in treating aluminum carbid with nitrogen gas at temperatures of from about 900° C. to about 1200° C.

2. The herein described process for producing aluminum nitrid, consisting in introducing nitrogen gas into a retort containing aluminum carbid which has been heated and maintained at a temperature of from about 900° C. to about 1200° C., cutting off the supply of heat, cooling the charge and removing the aluminum nitrid produced.

In testimony whereof we affix our signatures.

MAURICE BARNETT.
LOUIS BURGESS.